US005531852A

United States Patent [19]

Walsh et al.

[11] Patent Number: 5,531,852

[45] Date of Patent: Jul. 2, 1996

[54] APPARATUS AND METHOD FOR END SEALING A CARTON

[75] Inventors: Joseph C. Walsh; Robert L. Conatser, both of Longmont, Colo.

[73] Assignee: Graphic Packaging Corporation, Paoli, Pa.

[21] Appl. No.: 234,824

[22] Filed: Apr. 28, 1994

[51] Int. Cl.$^{6}$ .............................. B32B 31/26; B31B 1/00

[52] U.S. Cl. .......................... 156/227; 53/484; 53/376.7; 156/443; 156/308.2; 156/308.4; 493/183

[58] Field of Search .................................. 156/217, 227, 156/443, 308.2, 308.4; 53/484, 491, 376.7, 377.2; 493/183

[56] References Cited

U.S. PATENT DOCUMENTS

| | | | |
|---|---|---|---|
| 3,325,968 | 6/1967 | Rumberger | 53/491 |
| 3,393,613 | 7/1968 | Shields | 156/217 |
| 3,753,823 | 8/1973 | Kuss | 156/217 |
| 3,788,917 | 1/1974 | Linda | 53/376.7 |
| 3,821,874 | 7/1974 | Jones | 493/183 |
| 3,977,306 | 8/1976 | Flynn | 53/376.7 |
| 4,254,173 | 3/1981 | Peer, Jr. . | |

OTHER PUBLICATIONS

Legacy™ Brochure, R. A. Jones & Co., Inc., 10/92–1.5M–F.

*Primary Examiner*—Michele K. Yoder
*Attorney, Agent, or Firm*—Klaas, Law, O'Meara & Malkin; Joseph J. Kelly

[57] ABSTRACT

Apparatus and method for forming a sealed end portion of a carton wherein at least one surface of the carton is formed from a material that functions as an adhesive when heated to a predetermined temperature and wherein each open end portion is sealed by folding minor flaps to close at least a portion of the open end portion, moving the carton by a relatively fixed elongated reinforcing strip of material, heating the material in at least a portion of a first major flap to the predetermined temperature, folding the first major flap so that at least a portion of the elongated reinforcing strip of material is located between fold lines of the folded minor flaps and the folded first major flap, folding a second major flap to a superposed relationship with the first major flap and applying pressure to the first and second major flaps against the elongated reinforcing strip of material while continuing the movement of the carton until the first and second major flaps are sealed together.

16 Claims, 2 Drawing Sheets

APPARATUS AND METHOD FOR END SEALING A CARTON

FIELD OF THE INVENTION

This invention relates generally to the end sealing of a carton and more particularly to the end sealing of a carton having at least one surface formed from a material that functions as an adhesive when heated to a predetermined temperature.

BACKGROUND OF THE INVENTION

There are many machines on the market that function to move folded cartons through a series of operations where the cartons are opened and placed successively on a moving conveyor. A desired product is inserted into each carton and the open end flaps are sealed. The most commonly used method for end sealing uses a hot melt adhesive between the first and second major end flaps. Many cartons are formed from blanks that have at least one surface formed from a material that functions as an adhesive when heated to a predetermined temperature such as the composite material described in U.S. Pat. No. 4,242,173 to A. D. Peer, Jr. which is incorporated herein by reference thereto. However, the adhesive formed by such heating does not function the same as a hot melt adhesive since the hot melt adhesive has a greater thickness than the relatively thin film of plastic material. Therefore, there is little tendency for relative movement between the first and second major flaps as pressure is applied thereto. However, when using the thin plastic film as an adhesive, it is difficult, if at all possible, to form an effective seal between the first and second major flaps. The folded end flaps (side, bottom and top) of most cartons do not provide sufficient rigidity to withstand the required additional pressure without moving. Therefore, the industry continues to use a hot melt adhesive at an additional cost.

BRIEF DESCRIPTION OF THE INVENTION

This invention provides reinforcing means located between the fold lines of the folded minor flaps and the folded first major flap of a carton so that at least a portion of the material on the first major flap may be raised to a predetermined temperature to function as an adhesive and the second major flap may be folded to a superposed relationship with the first major flap and sufficient pressure may be applied to the folded first and second major flaps against the reinforcing means to seal the first an second major flaps together.

In a preferred embodiment of the invention, apparatus is provided for sealing at least one open end portion of a carton having at least one surface formed from a material that functions as an adhesive when heated to a predetermined temperature. The material may be a plastic material, such as polyethylene, that functions as an adhesive when raised to a temperature of between about 250°–300° F. or other materials at other temperatures as described in the above-identified Peer, Jr. patent. The at least one open end includes two minor flaps which are integral with opposite sidewalls of the carton and joined thereto by fold lines, a first major flap and a second major flap. A conveyor is provided for moving cartons in succession from an entrance portion to an exit portion. A product is inserted into the carton and first folding means fold the minor flaps to cover at least a portion of the at least one open end portion. Heating means are provided for heating at least a portion of the material on the first major flap to the predetermined temperature. Reinforcing means are mounted at a fixed location adjacent to at least a portion of the conveyor and extend in a direction parallel to the direction of movement of the conveyor. The reinforcing means preferably comprise an elongated strip of metal mounted as a cantilever. Second folding means fold the first major flap so that at least a portion of the reinforcing means is located between the fold lines of the folded minor flaps and the folded first major flap. Third folding means fold the second major flap to a location superposed over the first major flap. Pressure applying means apply pressure on the first and second major flaps against the reinforcing means as the carton moves over the reinforcing means to seal the first and second major flaps together. The fold lines of the folded minor flaps form abutments for the reinforcing means to restrain inward movement of the first and second major flaps. The carton moves to the exit portion leaving the reinforcing means behind. Additional heating means are provided for heating the second major flap, but maintaining the material thereon at a temperature less than the predetermined temperature. If the other end portion of the carton is open, the flaps thereof may be folded and sealed using similar apparatus.

In operation, a plurality of cartons are placed on a moving conveyor to move the cartons in succession from an entrance portion to an exit portion. A desired product is inserted into each carton. The minor flaps are folded to cover at least a portion of the at least one open end portion. The carton is moved along side of a relatively fixed reinforcing means. At least a portion of the material on the first major flap is heated to the predetermined temperature. The first major flap is folded so that at least a portion of the reinforcing means is located between the fold lines of the folded minor flaps and the folded first major flap. The second major flap is heated to a temperature less than the predetermined temperature, folded to be in a superposed relationship with the first major flap and pressure is applied to the folded first and second major flaps. Inward movement of the first and second major flaps is resisted by contact between the reinforcing means and the fold lines while continuing the movement of the cartons to seal the first and second major flaps together. The continued movement of the conveyor moves the sealed carton away from the reinforcing means.

BRIEF DESCRIPTION OF THE DRAWINGS

Preferred embodiments of the invention are illustrated in the drawings in which.

DETAILED DESCRIPTION OF THE INVENTION

Figure 1:
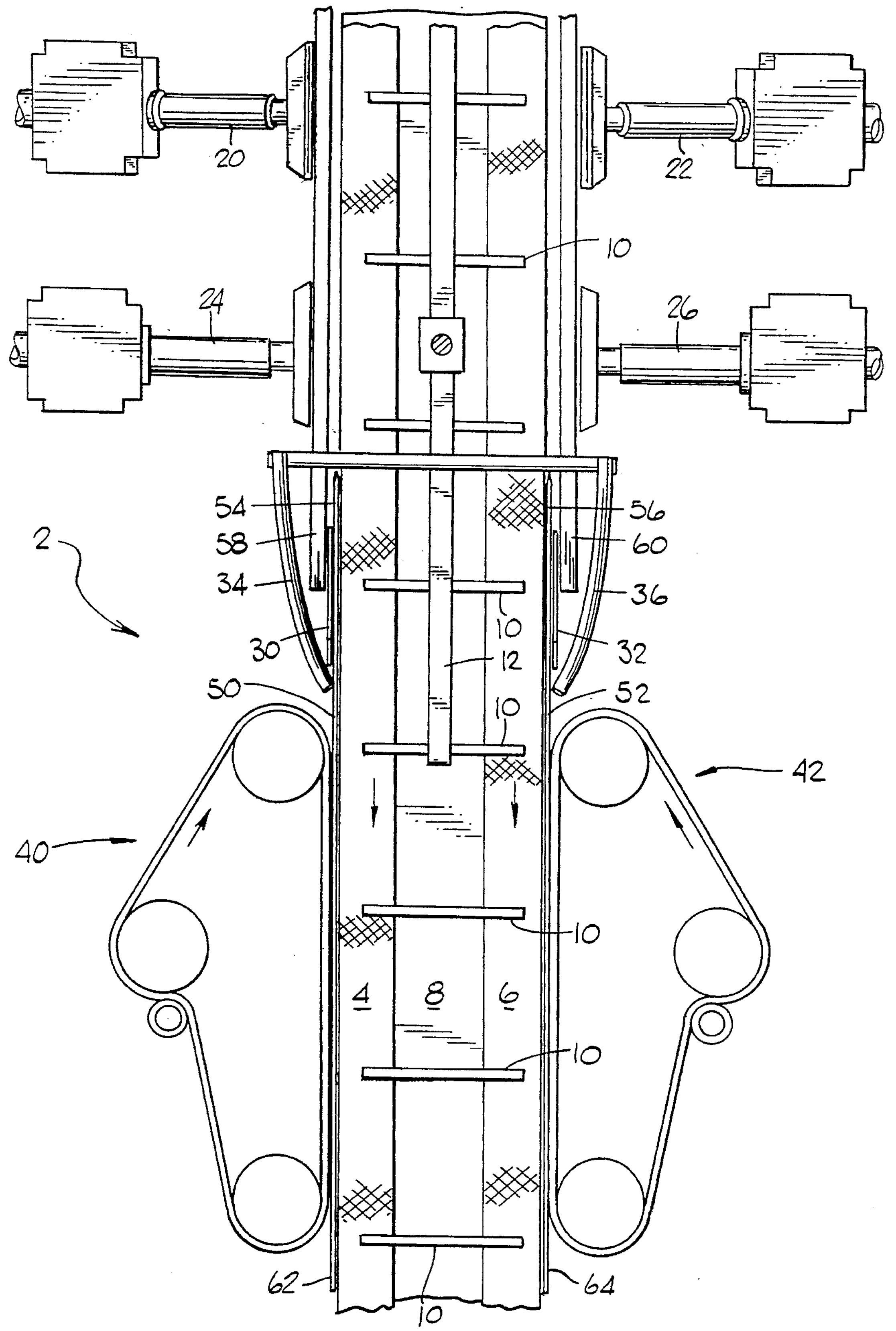
FIG. 1 is a schematic top plan view of the apparatus for use in this invention.

In FIG. 1 there is illustrated a portion of the apparatus 2 used with this invention. A conveyor comprising two spaced apart moving endless belts 4 and 6 move over a fixed bed plate 8. A plurality of spaced apart abutments 10 are secured to the conveyor belts 4 and 6 for movement therewith and function to retain a carton (not shown in FIG. 1) in place while operations are performed thereon. It is understood that the conveyor itself forms no part of the invention and that any conventional carton processing conveyor may be used. A bar 12 holds the carton on the conveyor belts 4 and 6.

First heating means 20 and 22 are located on each side of the conveyor and are directed to apply heat to cartons on the conveyor. Second heating means 24 and 26 are also located on each side of the conveyor and are directed to apply heat to cartons on the conveyor. The first and second heating means are illustrated as hot air blowers but it is understood that other types of heating means can be used and be positioned at locations other than as illustrated.

First folding means 30 and 32 are located on each side of the conveyor and function to fold the first major flaps of a carton, as described below. Second folding means 34 and 36 are also located on each side of the conveyor and function to fold the second major flaps of a carton, as described below. The first and second folding means can be positioned at locations other than as illustrated.

Pressure applying means 40 and 42 are located on each side of the conveyor and function to apply pressure to the first and second major flaps until they are in a sealed relationship as described below.

Reinforcing means 50 and 52 are located on each side of the conveyor and are mounted in a cantilever manner by securing the end portions 54 and 56 to fixed frame portions 58 and 60. The other end portions 62 and 64 are free to move.

Figure 2:
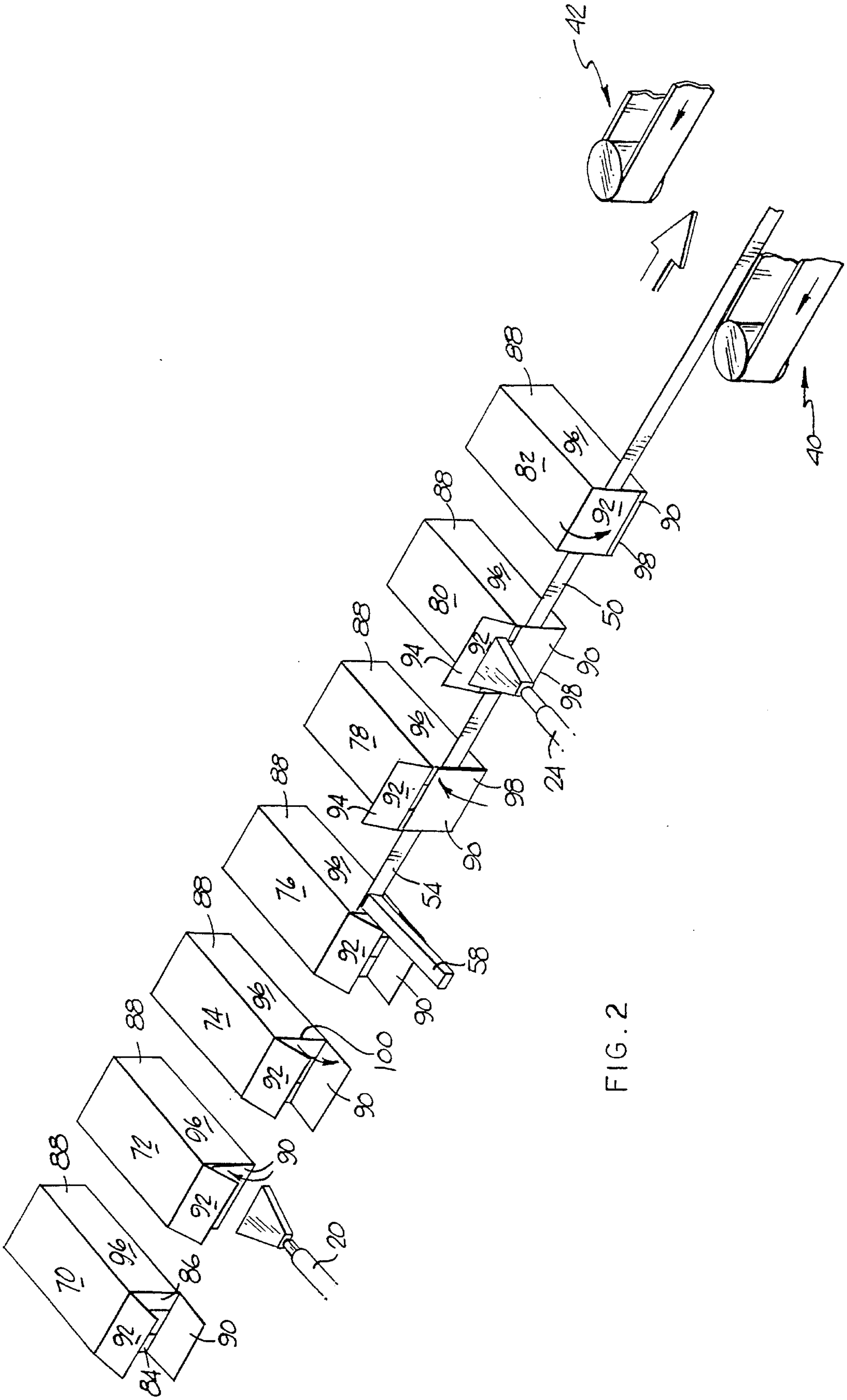
FIG. 2 is a perspective view illustrating the operation of this invention.

The sealing of one open end of a carton is illustrated in FIG. 2. Cartons 70, 72, 74, 76, 78, 80 and 82 are at spaced apart locations. Carton 70 has been opened, filled with a product and the minor flaps 84 and 86 have been folded to close at least a portion of the open end. The outer surface 88 of the cartons is formed from a material, such as polyethylene, that functions as an adhesive when heated to a temperature between about 250° to 300° F. The first major flap 90 of carton 72 has been folded up and the first heating means 20 has raised the temperature of at least a portion of the first major flap 90 to between about 250° to 300° F. The first major flap 90 of carton 74 has been folded back down. Carton 76 is entering the location of the one end portion 54 of the reinforcing means 50. The first major flap 90 will pass underneath the frame portion 58 and the second major flap 92 will pass over the frame portion 58. The first major flap 90 of carton 78 has been folded up so that a portion of the reinforcing means 50 is located between the fold lines 100 of the folded minor flaps 84 and 86 and the folded first major flap 90 and the second major flap 92 have been folded up. The second heating means 24 is applying heat to the inner surface 94 of carton 80 to raise the temperature thereof to that which is less than that required for the outer surface 88 to function as an adhesive. The inner surface 94 is formed from a conventional material such as paperboard. The second major flap 92 of carton 82 has been folded to a position superposed over the first major flap 90 and the carton 82 is about to be moved between the pressure applying means 40 and 42.

Each of the reinforcing means 50 and 52 is formed from spring steel which is coated with a material having a low coefficient of friction so that the inner surface 94 of the first major flap 90 and the end portions of the sidewalls 96 which are the fold lines 100 between the minor flaps 84 and 86 and the sidewalls 96 will readily slide over the reinforcing means 50 and 52. Each reinforcing means 50 and 52 has a width of between about 0.375 and 0.50 inch and a thickness of between about 6 to 10 mils. As illustrated in carton 78, 80 and 82, the reinforcing means 50 is located behind the portion of the first major flap 90 spaced from the fold line 98 so that a portion of the second major flap 92 is not sealed to the first major flap 90. As the pressure applying means applies pressure to the first and second major flaps 90 and 92, a portion of the reinforcing means 50 contact the end portions of fold lines 100 of the sidewalls 96 and form an abutment to prevent the inward movement of the first and second major flaps 90 and 92. This abutting relationship will continue until each carton moves out of a location between the pressure applying means 40 and 42 and moves over the end portion 62 of the reinforcing means 50. At this time, an effective seal will be formed between portions of the first and second major flaps.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Apparatus for sealing at least one open end portion of a carton having at least one surface formed from a material that functions as an adhesive when heated to a predetermined temperature and wherein the at least one open end portion of a carton has minor flaps, a first major flap and a second major flap comprising:

a conveyor for moving cartons in succession from an entrance portion to an exit portion wherein the minor flaps of each of said cartons have been folded to cover at least a portion of said at least one open end portion;

said minor flaps being integral with opposite sidewalls of each of said cartons and joined thereto by fold lines;

heating means for heating at least a portion of said material on said first major flap to said predetermined temperature;

reinforcing means;

mounting means for mounting said reinforcing means at a fixed location adjacent to at least a portion of said conveyor so that, as said carton moves by said mounting means, said first major flap passes below said mounting means and said second major flap passes above said mounting means;

said reinforcing means extending in a direction parallel to the direction of movement of said conveyor;

first folding means for folding said first major flap so that at least a portion of said reinforcing means is located between at least portions of said fold lines of said folded minor flaps and at least a portion of said folded first major flap;

second folding means for folding said second major flap to a location superposed over said first major flap;

pressure applying means for applying pressure on at least portions of said first and second major flaps as said carton moves over said reinforcing means to seal at least portions of said first and second major flaps together;

at least portions of said fold lines of said folded minor flaps forming abutments for said reinforcing means to restrain inward movement of said first and second major flaps; and said reinforcing means comprise an elongated strip of material that is mounted as a cantilever with its free end adjacent to said exit portion.

2. Apparatus as in claim 1 and further comprising:

additional heating means for heating said second major flap but maintaining said material thereon at a temperature less than said predetermined temperature.

3. Apparatus as in claim 1 wherein:

said first major flap being joined to said carton by a fold line and having an opposite end portion spaced from said fold line; and said heating means being located to heat only said material in said opposite end portion to said predetermined temperature.

4. Apparatus as in claim 3 and further comprising:

additional heating means for heating said second major flap but maintaining said material thereon at a temperature less than said predetermined temperature.

5. Apparatus as in claim 4 wherein said reinforcing means comprise:

an elongated strip of material that is mounted as a cantilever with its free end adjacent to said exit portion.

6. Apparatus as in claim 1 and further comprising:

said first major flap having a fold line and an end portion spaced from said fold line; and said reinforcing means being located behind said end portion.

7. Apparatus for sealing opposite open ends of a carton having at least one surface formed from a material that functions as an adhesive when heated to a predetermined temperature and wherein each of the opposite open end portions has opposite minor flaps, opposite first major flaps and opposite second major flaps comprising:

a conveyor for moving cartons in succession from an entrance portion to an exit portion wherein the minor flaps of each of said cartons have been folded to cover at least a portion of each of said opposite open end portions;

said opposite minor flaps being integral with opposite sidewalls of each of said cartons and joined thereto by opposite fold lines;

opposite heating means for heating at least a portion of said material on said opposite first major flaps;

opposite reinforcing means;

mounting means for mounting said opposite reinforcing means at fixed locations adjacent to said conveyor so that, as said carton moves pass said mounting means, said first major flaps pass below said mounting means and said second major flaps pass above said mounting means;

each of said opposite reinforcing means extending in a direction parallel to the direction of movement of said conveyor;

opposite first folding means for folding said opposite first major flaps so that a portion of said opposite reinforcing means is located between at least a portion of said opposite fold lines of each of said folded opposite minor flaps and said folded opposite first major flaps;

opposite second folding means for folding said opposite second major flaps to a location superposed over said opposite first major flaps;

opposite pressure applying means for applying pressure on at least portions of said second major and first major flaps as said carton moves over said opposite reinforcing means to seal at least portions of said first and second major flaps together;

at least portions of said opposite fold lines of said opposite minor flaps forming opposite abutments for said opposite reinforcing means to restrain inward movement of said opposite first and second major flaps; and said opposite reinforcing means each comprise an elongated strip of material that is mounted as a cantilever with its free end adjacent to said exit portion.

8. Apparatus as in claim 7 and further comprising:

opposite additional heating means for heating said opposite second major flap but maintaining said material thereon at a temperature less than said predetermined temperature.

9. Apparatus as in claim 7 wherein:

said opposite first major flaps are joined to said carton by a fold line and having an opposite end portion spaced from said fold line; and said heating means being located to heat only said material in said opposite end portion to said predetermined temperature.

10. Apparatus as in claim 9 and further comprising:

opposite additional heating means for heating said opposite second major flap but maintaining said material thereon at a temperature less than said predetermined temperature.

11. Apparatus as in claim 7 wherein said heating means and said additional heating means comprise:

hot air blowers.

12. Apparatus as in claim 7 and further comprising:

each of said opposite first major flaps having a fold line and an end portion spaced from said fold line; and each of said opposite reinforcing means being located behind said end portion.

13. A method for sealing at least one open end portion of a carton having at least one surface formed from a material that functions as an adhesive when heated to a predetermined temperature and wherein the at least one end portion has minor flaps integral with opposite sidewalls of the carton and joined thereto by fold lines, a first major flap and a second major flap and wherein the minor flaps of each carton have been folded inwardly to cover at least a portion of the opening and the carton has been placed on a moving conveyor comprising:

moving said carton pass a relatively fixed reinforcing means so that said first major flap passes below said relatively fixed reinforcing means and said second major flap passes above said relatively fixed reinforcing means;

heating at least a portion of said material on said first major flap to said predetermined temperature;

folding said first major flap so that at least a portion of said reinforcing means is located between at least portions of said fold lines of said folded minor flaps and at least a portion of said folded first major flap;

folding said second major flap to a location superposed over said first major flap;

applying pressure to said folded first and second major flaps against said reinforcing means while continuing the movement of said cartons to seal at least portions of said first and second major flaps together; and restraining inward movement of said first and second major flaps by contact between portions of said reinforcing means and at least portions of said fold lines of said folded minor flaps.

14. A method as in claim 13 and further comprising:

heating said second major flap to a temperature less than said predetermined temperature prior to folding said second major flap to said superposed relationship.

15. A method as in claim 13 and further comprising:

providing said carton with an opposite open end portion;

moving said carton by a relatively fixed opposite reinforcing means;

heating at least a portion of said opposite first major flap to said predetermined temperature;

folding said opposite first major flap so that at least a portion of said opposite reinforcing means is located between said fold lines of said opposite minor flaps and said opposite first major flap;

folding said opposite second major flap to a location superposed over said opposite first major flap;

applying pressure to said folded opposite first and second major flaps against said opposite reinforcing means while continuing the movement of said carton to seal said opposite first and second major flaps together; and restraining inward movement of said opposite first and second major flaps by contact between portions of said opposite reinforcing means and said fold lines of said opposite minor flaps.

16. A method as in claim 15 and further comprising:

heating said opposite second major flap to a temperature less than said predetermined temperature prior to folding said opposite second major flap to said superposed relationship.

* * * * *